United States Patent
Martin et al.

[11] Patent Number: 5,909,485
[45] Date of Patent: Jun. 1, 1999

[54] METHOD OF PREPAYING FOR CONSUMPTION OF TELEPHONE CALLS

[75] Inventors: Daniel Martin, La Trinite sur Mer; Christian Grezes, Issy les Moulineaux; Annick Seghers, Paris, all of France

[73] Assignee: France Telecom, Paris, France

[21] Appl. No.: 08/813,498

[22] Filed: Mar. 7, 1997

[30] Foreign Application Priority Data

Mar. 7, 1996 [FR] France .................................. 96 03128

[51] Int. Cl.⁶ ................. H04M 17/00; H04M 15/00; H04M 11/00
[52] U.S. Cl. ............. 379/144; 455/406; 455/405; 379/91.01; 379/93.03; 379/115; 379/118; 379/114
[58] Field of Search ................. 379/114, 144, 379/112, 113, 115, 91.01, 91.02, 93.03, 93.02, 118; 455/406, 407–411, 405, 403

[56] References Cited

U.S. PATENT DOCUMENTS

| | | | |
|---|---|---|---|
| 4,706,275 | 11/1987 | Kamil | 379/114 |
| 4,776,000 | 10/1988 | Parienti | 379/144 |
| 4,951,308 | 8/1990 | Bishop et al. | 379/144 |
| 4,965,821 | 10/1990 | Bishop et al. | 379/144 |
| 5,138,650 | 8/1992 | Stahl et al. | 378/114 |
| 5,148,472 | 9/1992 | Freese et al. | 379/114 |
| 5,163,087 | 11/1992 | Kaplan | 379/142 |
| 5,264,689 | 11/1993 | Maes et al. | 235/492 |
| 5,359,182 | 10/1994 | Schilling | 379/114 |
| 5,440,621 | 8/1995 | Castro | 379/114 |
| 5,577,100 | 11/1996 | McGregor et al. | 379/114 |
| 5,583,918 | 12/1996 | Nakagawa | 379/114 |
| 5,592,535 | 1/1997 | Klotz | 379/114 |
| 5,631,947 | 5/1997 | Wittstein et al. | 379/114 |
| 5,722,067 | 2/1998 | Fougnies et al. | 379/114 |
| 5,732,346 | 3/1998 | Lazaridis et al. | 379/114 |
| 5,745,556 | 4/1998 | Ronen | 379/114 |
| 5,758,286 | 5/1998 | Leppanen | 379/114 |
| 5,774,802 | 6/1998 | Tell et al. | 379/114 |
| 5,796,790 | 8/1998 | Brunner | 379/406 |

FOREIGN PATENT DOCUMENTS

| | | |
|---|---|---|
| 0698 987 A2 | 2/1996 | European Pat. Off. . |
| 2171877 | 9/1986 | United Kingdom . |
| 2215897 | 9/1989 | United Kingdom . |
| WO 96/15633 | 5/1996 | WIPO . |

*Primary Examiner*—Curtis A. Kuntz
*Assistant Examiner*—Rexford N Barnie
*Attorney, Agent, or Firm*—Lowe Hauptman Gopstein Gilman & Berner

[57] ABSTRACT

To limit the risk of unpaid telephone calls to be set up from a predetermined terminal via a switched telephone network, a prepayment for consumption of such calls comprises setting up a call from any terminal to a prepayment server via the switched telephone network in order to transmit a message identifying the predetermined terminal to the prepayment server; responsive to identification of the predetermined terminal, requesting from the calling terminal prepayment of telephone call consumption to the prepayment server; and, if the prepayment request is accepted by the prepayment server, paying an amount transmitted from the calling terminal so that the payment server increments a consumption count associated with the predetermined terminal. The predetermined terminal and any terminal can be one and the same mobile phone terminal connected to the switched telephone network via a mobile phone network.

12 Claims, 3 Drawing Sheets

METHOD OF PREPAYING FOR CONSUMPTION OF TELEPHONE CALLS

BACKGROUND OF THE INVENTION

The present invention concerns a method of prepayment for telephone call consumption.

OBJECT OF THE INVENTION

The main object of the invention is to limit the risk of unpaid for telephone calls set up by means of a telephone terminal and to avoid the contentious procedures inherent to such unpaid calls.

SUMMARY OF THE INVENTION

Accordingly a method of prepaying for consumption of telephone calls to be set up by means of a predetermined terminal via a switched telephone network, comprises the following steps:

setting up a call from any terminal to prepayment processing means via the switched telephone network in order to transmit a message identifying the predetermined terminal to the prepayment processing means, responsive to identification of the predetermined terminal, requesting from the any terminal prepayment of telephone call consumption to the prepayment processing means, and if the prepayment request is accepted by the prepayment processing means, paying an amount transmitted from the any terminal so that the prepayment processing means increments a consumption count associated with the predetermined terminal.

The call setting-up step comprises entrying an identification number identifying the predetermined terminal and a control key at the any terminal so that they are included in the identification message, and checking mutually consistency between the identification number and the control key in accordance with a predetermined algorithm in the prepayment processing means and, when consistency is established, verifying that the identification number is included in a list stored in the prepayment processing means, the call being held by the payment processing means when the number of consistency errors does not exceed a predetermined number and when the identification number is included in the list.

By "any terminal" is meant any telephone terminal of any type, including a mobile phone, and this includes the predetermined terminal.

The user of the predetermined terminal can consume telephone calls as long as the consumption account is positive, and must pay an amount as soon as the account becomes negative. In this way the user is made more sensitive to the cost of calls and the organization managing the terminals is less burdened by disputes with its clients over unpaid calls.

According to a particular embodiment, the predetermined terminal and the any terminal are one and the same terminal which is a mobile phone terminal connected to the switched telephone network via a mobile phone network. A method of prepaying for consumption of telephone calls to be set up by means of the mobile phone terminal comprises the following steps:

entrying a particular telephone number at the mobile phone terminal thereby setting up a call from the mobile phone terminal to the mobile phone network, translating the particular telephone number into a call number of the prepayment processing means by the mobile phone network, setting up a call by means of the particular telephone number from the mobile phone network to prepayment processing means through the switched telephone network whereby the mobile phone network transmits a message including an identification number identifying the mobile phone terminal to the prepayment processing means, verifying that the identification number is included in a list stored in the prepayment processing means, thereby clearing down the call by the payment processing means when the identification number is not included in the list, when the identification number is included the list, requesting from the mobile phone terminal prepayment of telephone call consumption to the prepayment processing means, and if the prepayment request is accepted by the prepayment processing means, paying an amount transmitted from the mobile phone terminal so that the preprepayment processing means increments a consumption count associated with the mobile phone terminal.

In order to dialog with all types of telephone terminal, the prepayment processing means transmits messages to the terminal via a voice and/or alphanumeric message server.

The requesting step includes selection of one of at least two methods of payment that can be a payment by electronic funds transfer (EFT) or a payment by bank card (CB).

For an electronic payment processing, the requesting step includes entrying a secret code at the any terminal. The prepayment processing means thus accepts the prepayment request if the secret code is recognized in association with the identification message and its entry has not been attempted a predetermined number of times.

The secret code is recorded in the prepayment processing means without comparing it with the identification message when the consumption count is incremented for the first time by an amount resulting from an electronic funds transfer.

For a payment by bank card, the requesting step includes a bank card payment by entering at the any terminal a predetermined number transmitted to the prepayment processing means which accept the prepayment request if the predetermined number is the correct length and/or is not included in a predetermined list of numbers.

Generally, the prepayment processing means can refuses the amount if one of cumulative totals of amounts paid by means of a selected one of methods of payment and of amounts paid to the consumption account associated with the predetermined terminal exceeds a respective maximal amount over a respective number of days, and/or if the number of payments by the selected method of payment exceeds a respective maximal number over a respective number of days.

In payment step, the prepayment processing means can transmit to said any terminal a balance of the consumption count before and after incrementing of the consumption count in order that the user checks his payment processing. For an analogous operation, after incrementing the consumption count, the prepayment processing means can transmit a provisional payment certificate to said any terminal if the payment is an electronic funds transfer.

To make payments by electronic funds transfer more secure, the method may include, after said payment step, an invitation to change a secret code used for electronic funds transfer and, in the event of a positive response to the invitation, a change of the secret code.

BRIEF DESCRIPTION OF THE DRAWINGS

The foregoing and other objects, features and advantages of the invention will be apparent from the following detailed description of several embodiments of the invention with reference to the corresponding accompanying drawings in which.

DESCRIPTION OF THE PREFERRED EMBODIMENTS

A preferred embodiment of the prepayment method of the invention is described hereinafter for the prepayment of consumption of outgoing and/or incoming telephone calls which are set up by a predetermined terminal, such as a portable mobile phone PRM of the "cordless" type for use in urban areas and having only a short radio range, e.g. a phone conforming to the CT2-CAI standard.

Figure 1:
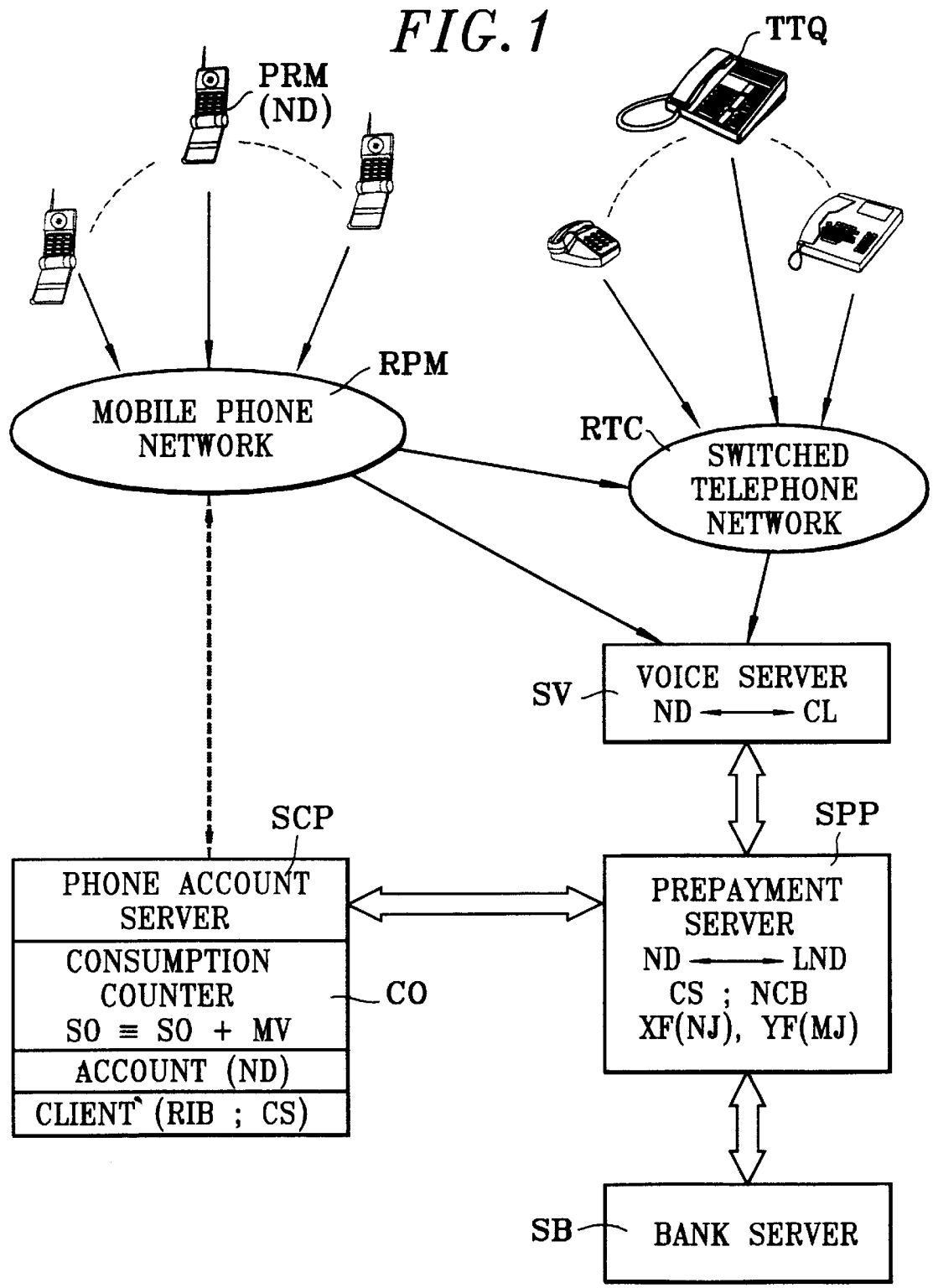
FIG. 1 is a block diagram of hardware and software means for implementing prepayment for telephone calls by mobile phones connected to the switched telephone network via a specific telecommunication network.

Referring to FIG. 1, the hardware and software means essential to implementing the prepayment method according to this embodiment comprise a specific digital mobile phone network RPM accessible by any PRM phone via fixed radio stations (telepoints) connected in groups to station connection units, a conventional telephone terminal TTQ of any kind connected to the public switched telephone network RTC directly or via specific telecommunication networks, such as a mobile phone network, a private telephone network, a packet-switched network, etc, a voice server SV connected to the telephone network RTC and to the mobile phone network RPM by a dedicated line or an X.25 type packet-switched link (switched virtual circuit), and three other servers SPP, SCP and SB connected to each other by X.25 type packet-switched links (switched virtual circuits).

The server SPP is a prepayment server that constitutes the core of the prepayment means shown diagrammatically in FIG. 1. Most of the instructions that the server SPP receives from the servers SB and SCP are retransmitted to the voice server SV which translates them into voice message for the user who is using a telephone terminal TTQ of any kind or a mobile phone PRM in order to make the prepayment, as will emerge hereinafter.

The server SCP is a mobile phone account server that contains all of the data for identifying a PRM phone and preferably data identifying the client of this phone who acquired it from the organization managing the PRM mobile phone. In particular, the phone account server contains telephone call consumption counters CO which are respectively associated with the mobile phones PRM. Each counter CO is incremented by an amount MV each time that a user of the PRM phone associated with the counter is authorized to make a prepayment and is decremented after each telephone call made from the PRM phone. The consumption counter CO is connected to the station connection unit serving the PRM phone, which transmits to the counter CO a personalized call docket containing all the information required for billing the call. In practise the server SCP is included in the system for managing the clients of the mobile phone network RPM and connected to the network RPM.

The prepayment server SPP contains a prerecorded list LND of account numbers ND which are respectively associated with mobile phones PRM and therefore with the counters CO included in the server SCP.

The server SB is a bank server that is managed by a bank with which the organization managing the mobile phones PRM has entered into transaction agreements on behalf of its clients/users.

The hardware and software means shown in FIG. 1 therefore enable registration of a monetary payment MV made in advance. This payment MV constitutes a reserve from which the amount of each telephone call effected by the associated phone PRM is deducted. The system bars any possibility of further calls on expiry of the credit in the associated counter CO, without cutting off calls in progress; the balance may become negative.

No invoice is sent to the PRM phone client/user. Only detail of calls is supplied, at the request of the client, by the organization managing the mobile phone network RPM.

When a subscription account is opened or a phone is activated for a client of the telephone consumption prepayment service, an account number ND on six or seven characters is allocated to the client, that is to say the number ND is associated with the mobile phone PRM of the client, this type of phone being identified by a phone number NP that can be detected by the network RPM. As the PRM phones are associated on a one-to-one basis with the account numbers ND, each new number ND is compared with the account numbers in the server SCP in order to avoid duplications. Additionally, a control key CL on one character is calculated from the account number ND using a predetermined algorithm defined by the organization managing the mobile phones. This key is entered by the user at the time of paying by means of a telephone terminal TTQ and guarantees the accuracy of the account number. On the other hand, the complete account number ND with its key CL is not entered in the case of a call to the voice server SV from the phone PRM. A readable badge-card carrying the account number ND and its key CL is supplied to the client.

When the account is opened, a specific contract is established and, in addition to the initial charges, a first amount at least equal to a minimal sum is paid by the phone client/user. This amount, which may also be paid the first time the phone is activated, is registered in the counter CO of the server SCP assigned to the client's phone PRM. At the same time, the complete account number ND+CL is registered in the server SPP and transmitted via the corresponding X.25 link to the prepayment server SPP which stores it in a list of account numbers LND.

Thereafter, the consumption counter CO is reloaded by accessing the voice server SV and via the prepayment server SPP, by means of bank card payments CB or by electronic funds transfer EFT in accordance with the method of the invention or by sending a cheque to the PRM phone client management center.

Payment by electronic funds transfer EFT requires the client to supply beforehand a bank identity voucher BIV for their bank account and an authorization from the bank concerned to debit the account by electronic funds transfer, all of this data being then registered in the server SPP and in the bank server SB. The payment is in bands of 100 francs, for example, and is limited to a maximum amount of 300 francs, for example.

Three payment options are offered to the client. The first two are part of the prepayment method of the invention. For a given account, no option is mutually exclusive with any other option.

For the option of payment by electronic funds transfer TEP, the client supplies a bank identity voucher BIV and a signed request authorizing debiting of the account by electronic funds transfer. This voucher BIV is mailed to the organization managing the prepayment server SPP.

To simplify payments by electronic funds transfer, a four-digit secret code CS is associated with the client's voucher BIV. The client enters the secret code CS for each payment operation, regardless of the method of access to the voice server SV. The secret code CS is personalized by the client himself during the first prepayment operation. This secret code is held in memory at the prepayment server SPP and is not memorized either in the mobile phone account server SCP or in the voice server SV.

The second option relates to payment by bank card. On each payment operation, calling from any telephone TTQ and having entered his complete account number ND+CL, the client enters the digits of his bank card number NCB, which in practise may comprise up to 19 digits, and then presses the # sharp key. In the case of a call from the mobile phone PRM, the account number is not to be dialled by the client, but is dialled by the network RPM.

This second option meets the following requirements:

multiple payers on the same account number, clients not choosing the option to pay by electronic funds transfer and secret code, one-off payment in the event of a change to or loss of the secret code CS of electronic funds transfer.

The third option is prepayment by cheque.

All information relating to new accounts and accounts that have been closed is fed to the server SCP, for example daily, which then transmits it to the server SPP which retransmits it to the server SB.

In the following description, the word "user" means the client to whom a predetermined phone PRM is issued and who is the only person known to the organization managing the phones PRM or any person requiring to use the PRM phone and/or to pay an amount to the credit of the account CO of the phone PRM in the server SCP, using the phone PRM or any telephone terminal TTQ.

Figure 2:
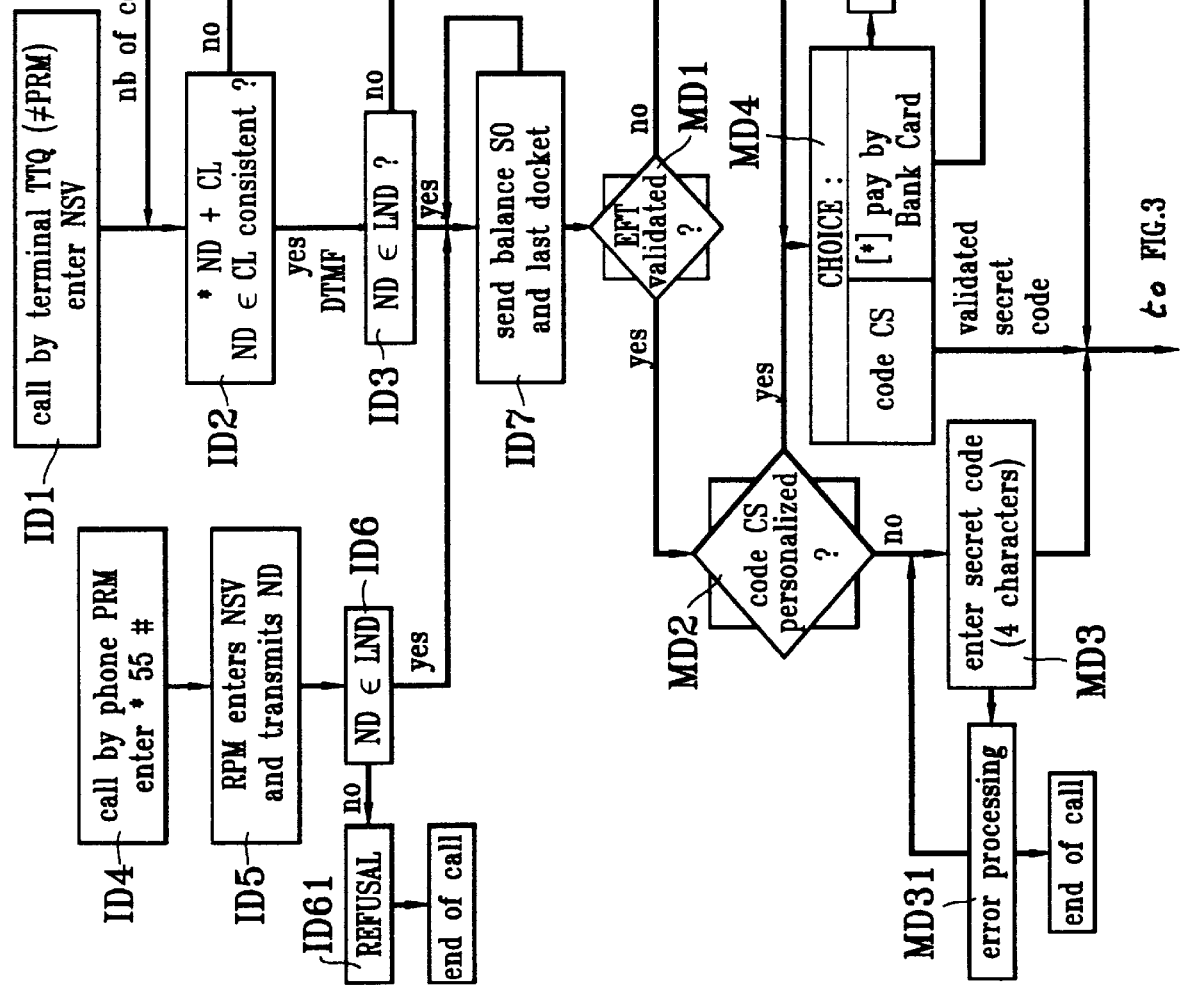
FIG. 2 is a flowchart of the first two main steps of a telephone call consumption prepayment method of the invention, to be more precise a call and phone identification step and a payment method step.
Figure 3:
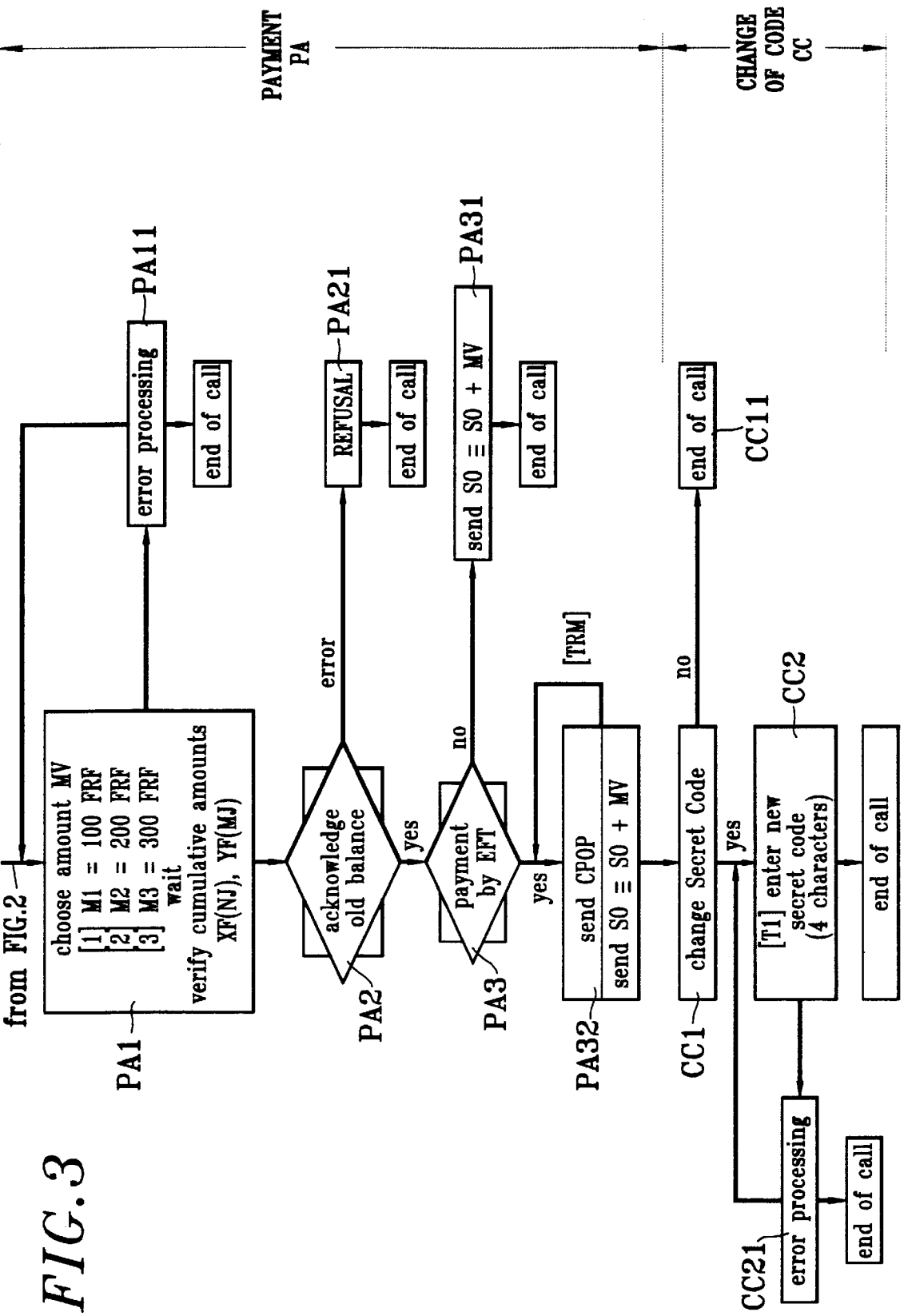
FIG. 3 is a flowchart of the last two main steps of the prepayment method, to be more precise a payment step and a code change step.

Referring to FIG. 2, the method of prepayment for consumption of telephone calls essentially comprises four main steps, a call and phone identification step ID, a payment method step MD, a payment step PA and, where necessary, a change of secret code step CC.

The phone identification step ID is implemented in two different ways, depending on whether the user wishes to credit the account CO of the predetermined mobile phone PRM, either by means of a telephone call from any telephone terminal TTQ which is a conventional fixed telephone or a telephone of some other type, for example a mobile phone, or by means of a telephone call from the predetermined mobile phone PRM itself.

When the user decides to use any telephone terminal TTQ, the identification step comprises three steps ID1, ID2 and ID3 and a final step ID7 common to the other way. In the initial step ID1, a call is set up to the voice server SV and continues through the subsequent steps. The user dials the telephone call number NSV of the voice server SV on the keypad of the terminal TTQ. A voice message specific to the mobile phone prepayment service is transmitted by the server SV to the terminal TTQ.

In the next step ID2 the user presses the [*] key and dials the complete account number ND+CL associated with the predetermined mobile phone PRM. In practise, the number to be dialled by the user comprises the account number ND proper with six or seven characters and a control key CL with one character associated with the number ND by the predetermined algorithm prerecorded in the server SV.

In step ID2 and the subsequent step ID3 the prepayment server SPP receives from the voice server SV and checks the account number ND identifying the mobile phone PRM. The list LND of account numbers ND complete with their respective key CL is initially recorded in the prepayment server SPP as accounts are opened and mobile phones are purchased.

Two checks are carried out.

In step ID2, the voice server SV checks that the key CL is consistent with the dialled account number ND using the predetermined calculation algorithm and prior to consulting the list. The maximum number of attempts to dial the number ND+CL allowed is three. In the event of a third failure, a specific refusal message resulting from keying error or from inactivity for a predetermined time period is sent to the user by the server SV in step ID21. The voice server SV then clears down the call.

If the voice server SV confirms that the number ND is consistent with the key CL in step ID2, it communicates the account number ND to the prepayment server, which checks that the account number ND is present in the list LND in step ID3. If the checking result is negative, a specific refusal message different from the previous one and indicating that the number ND dialled in does not correspond to any numbered account in the list LND, is sent by the server SV on the instruction of the server SPP in the step ID31, which instruction is also transmitted to the account server SCP.

In the second way of carrying out the main call and identification step ID, the user decides to use the predetermined mobile phone PRM in the initial step ID4. The user enters on his mobile phone PRM a short-code number *55# corresponding to the voice server SV in step ID4.

The management system in the mobile phone network RPM translates the short-code number into the call number NSV of the voice server SV or another number specially assigned to the server SV in step ID5. Then, after setting up the link to the server SV, the RPM network management system dials the account number ND without the control key CL, since the management system, including the account server SCP, receives in each call from the phone PRM the phone identification number NP held in memory in the phone PRM and associated with the number ND of the account when the latter is opened. In this case the voice server does not check the key CL associated with the account number ND. A specific "please wait" voice message is sent by the voice server SV for verification of the account number ND in step ID6, as in step ID3.

The prepayment server SPP checks that the account number ND exists. If the number ND is not in the list LND, a refusal message, different from the refusal message in step ID31 following a keying error, is sent by the voice server SV to the phone PRM via the network RPM in step ID61 and this refusal is also transmitted to the account server SCP.

After the identification of the phone PRM following a call from any terminal TTQ or from the phone PRM, step ID3 or ID6 is followed by a balance consultation step ID7. The voice server SV sends an account statement request to the prepayment server SPP.

The server SPP then checks the cumulative total paid for the account identified by the number ND verified in step ID3 or ID6. If this cumulative total exceeds YF francs over a sliding period of MJ days, a refusal message is sent and the call is cleared down, as in step PA11 described below.

If the cumulative total does not exceed YF francs over a sliding period of MJ days, the server SPP returns the balance SO of the account CO associated with the phone PRM in "real time" after direct consultation in the server SCP, having received the account number ND by way of address.

A voice message is sent by the server SV indicating to the user the balance of his telephone call consumption account CO, and the date and the time of the last call docket processed.

If the server SCP is unavailable or if the link between the latter and the prepayment server SPP is unavailable, a fault type message is sent by the server and the call is cleared down.

By pressing a message retransmission key [TRM], corresponding in practise to the digit 8, the user can hear the last voice message again.

The following methods of payment are proposed in step MD1:

by electronic funds transfer EFT, by bank card CB.

The payment method MD main step essentially comprises two ways of requesting prepayment according to whether the client of the phone PRM has opted for prepayment by electronic funds transfer or not.

If the electronic funds transfer account is valid, the user is directed by a specific message to requesting payment by electronic funds transfer, after consultation of the prepayment server SPP. If the electronic funds transfer account is not valid, for example if the request to debit the account by electronic funds transfer has not been validated, the user is directed to requesting payment by bank card. These two ways of requesting prepayment are described in detail below.

If the client has opted for payment by electronic funds transfer, the prepayment server SPP checks that the bank identity voucher of the client exists and that the electronic funds transfer account is valid.

The processing carried out by the prepayment server SPP depends on whether or not there is a four-digit secret code CS associated with the bank identity voucher of the client in step MD2.

If debiting of the account by electronic funds transfer is valid in step MD1 and if the secret code CS has not been personalized beforehand, the user is invited by a specific message to choose a four-digit secret code to be associated with the bank identity voucher in step MD4. In the event of transmission errors or if the secret code CS is entered too slowly, for example, a refusal message is transmitted to the user and the call is cleared down after three attempts in step MD31.

If the electronic funds transfer account is valid and if the secret code exists in steps MD1 and MD2, the user is invited by a message specific to step MD3 to enter his secret code CS.

If the user attempts to key in the secret code CS the server SPP checks the validity of the secret code CS keyed in against a list of secret codes addressed by means of the account number. A maximum of three attempts are authorized. After a third failure, a refusal message is sent in step MD41 and the call to the servers SV and SPP is cleared down.

The message inviting the user to key in the secret code in step MD4 also invites the user to choose the second method of payment by bank card, by pressing the star key [*]. Regardless of the status of the electronic funds transfer account, the user can prepay in this way without knowing the secret code CS, by debiting a bank account that is a priori separate from that of the client/owner of the phone PRM associated with the account number ND. This option allows the client to lend or hire his PRM phone to the user without including in the account the cost of calls between them.

In the event of any anomaly in the previous checks, when keying in the secret code CS, a specific refusal message is sent in step MD41 and the method of payment by bank card is offered to the client.

As will emerge below, the server SPP calculates a provisional payment operation certificate CPOP and issues it to the user with the agreement for payment. If the agreement is refused, the refusal message is then sent and the call to the payment server is cleared down.

After step MD1 or MD4 indicating that payment by electronic funds transfer is impossible or has not been selected, the user requests payment by bank card. The user then enters his bank card number NCB of between 10 and 19 digits, and then presses the [#] sharp key in step MD5. The following checks are in practise carried out by the prepayment server SPP:

the identification of a foreign bank card that is rejected, the card number control key and the length of the card number, the absence of the card number NCB from the lists supplied by the server SB of the bank associated with the organization managing the mobile phone network RPM.

A maximum of three attempts to key in the card number NCB are authorized. A refusal message is sent in the case of a third failure in step MD51 and the call to the prepayment server is cleared down.

Alternatively, instead of the bank card number NCB, the user enters a shorter secret code which is also checked by the server SPP.

After correct entry of the secret code CS in step MD3 or MD4 or the bank card number NCB in step MD5 indicating acceptance of a request for prepayment by the server SPP, the payment step PA comprising three steps PA1, PA2 and PA3 is the next step.

The prepayment server SPP proposes three choices C1, C2 and C3 respectively corresponding to the [1], [2], [3] keys of the phone and to prepayment amounts in bands: M1=FF 100, M2=FF 200 and M3=FF 300, in step PA1. The user enters one of the three choices C1, C2 or C3 by pressing the corresponding key on the keypad of his phone TTC or PRM, for example the [1], [2] or [3] key.

For payment by bank card, the prepayment server SPP requests bank authorization of the bank server SB if the cumulative amount paid by means of the bank card exceeds XF francs and/or if the number of payments by means of the bank card exceeds a maximum MA over a sliding period of NJ days. During this consultation, the prepayment server sends a "please wait" message by means of the voice server SV in step PA1. If authorization is refused, a refusal message is sent and the call with the prepayment server SPP is cleared down in step PA11.

Still in step PA1, if payment by bank card has been selected and authorized, or if payment by electronic funds transfer EFT has been selected previously, the prepayment server SPP checks the cumulative amount total paid for the account corresponding to the number ND. If this cumulative total exceeds YF francs over a sliding period of MJ days, a refusal message is sent in step PA11 and the call is cleared down.

If the results of the cumulative total checks carried out by the prepayment server SPP are positive, the prepayment server sends to the phone account server SCP a message including the client account number ND and the amount paid MV=M1, MV=M2 or MV=M3 to be added to the consumption account CO. The server SCP automatically updates the current balance of the consumption account and transmits an acknowledgment message to the server SPP in step PA2. The old balance SO of the phone PRM is retransmitted with this acknowledgment in a first period.

If the acknowledgment is negative, the payment is refused. A refusal message is then sent, the call is cleared down and the transaction is cancelled in step PA21.

Similarly, if there is no acknowledgment, in the event of unavailability of the application or of the link between the servers SCP and SPP, an incident type message is sent, the call to the servers SV and SPP is cleared down and the transaction is cancelled in step PA21.

After step PA2, the user is informed by a voice message of the acceptance of his payment and of his new balance SO. The new balance SO=SO+MV is calculated by the server SCP by adding the payment MV to the old balance previously communicated to the user, and the consumption account CO is updated.

If the payment is recognized as effected by bank card, in the next step PA3, the server SPP issues the new balance via the voice server SV and then the call is cleared down in step PA31.

If the payment is recognized as made by electronic funds transfer EFT, in the next step PA3, the server SPP send via the server SV, in step PA32, not only the new balance but also a provisional payment operation certificate CPOP in the form of the number of the payment operation by electronic funds transfer EFT that the client, the holder of the bank account, will find in his bank account statement.

The prepayment server SPP then moves to the last main step change of secret code CC. The voice server SV invites the user to change his secret code in the next step CC1. This change is possible only for payment by electronic funds transfer EFT, the method of payment by bank card not requiring any secret code.

If the user does not want to modify the secret code, the user or the server SV after a predetermined time-delay clears down the call in step CC11.

If the user does want to change the secret code, he indicates this by pressing a predetermined key [T1], for example with the digit 1, and then keys in his new secret code on four digits, any combination except [0000], in step CC2. The server SV transmits it via the server SPP to the phone account server SCP which substitutes the new secret code for the old secret code. The call is then cleared down by the user or by the server SV.

If transmission errors occur, the server SV invites the user to enter his secret code again in step CC21. The call is cleared down after three attempts.

The data for payments effected and operations refused by the method described hereinabove is sent in real time in the form of operation messages over the X.25 link (switched virtual circuit) from the prepayment server SPP to the phone account server SCP. The operation message contains the account number ND, the nature of the operation, the information entered by the user an the cause of the refusal, where applicable.

The list of reconciliation payments is sent by an off-line message, each night, from the prepayment server SPP to the bank server SB and to the phone account server SCP. The message contains the account number, the characteristics of the payment concerned and the date of transfer to the bank.

At the end of each prepaid call using the predetermined phone PRM, a call docket is established and billed by a quick response center associated with the station connection units in the mobile phone network RPM. The call is billed at the tariff defined by the characteristic of the subscription to the prepayment service. Each call docket is transmitted by the quick response center to the account server SCP. The amount of the docket is added to the total of previous consumption. The new total consumption amount MT is compared with a consumption limit LC in the following manner:

if the amount MT is greater than or equal to the limit LC, then any telephone call consumption is prohibited to the client, i.e. through the intermediary of the client's phone PRM;

if the amount MT is less than the limit LC, then there is no call barring but a warning may be issued; two warning thresholds S1 and S2 advise the user by means of a specific message that they are reaching the end of their consumption credit as totalled in their counter CO in the server SCP.

When the amount MT crosses the threshold S1, which is higher than the threshold S2, a single warning message is sent via the servers SPP and SV. On crossing the threshold S2, and on each call as long as the amount is less than the threshold S2, a warning message is transmitted systematically via the servers SPP and SV.

The warning message is common to all warnings.

Although the method of the invention has been described hereinabove for prepayment for consumption of telephone calls relating to a phone PRM, the method applies to prepayment for telephone call consumption relating to any telephone terminal, whether of the conventional or mobile phone type, for example, or of the videotex or teletex type connected to the public switched telephone network or via a dedicated telecommunication network. In the latter case, the information messages transmitted by the prepayment server SPP are translated by the server SV into alphanumeric messages for display or printing in the terminal and into voice messages for conventional telephone terminal.

What we claim is:

1. A method of prepaying for consumption of telephone calls to be set up by a predetermined terminal via a switched telephone network, comprising the following steps:

setting up a call from any terminal of the network to a prepayment processor via said switched telephone network in order to transmit a message identifying said predetermined terminal to said prepayment processor, in response to identification of said predetermined terminal, requesting from said any terminal of the network prepayment of telephone call consumption to said prepayment processor, and if the prepayment request is accepted by said prepayment processor, paying an amount transmitted from said any terminal of the network so that said prepayment processor increments a consumption count associated with said predetermined terminal, the call setting-up step comprising:

entering, by a user of said any terminal of the network keying (a) an identification number identifying said predetermined terminal and (b) a control key at said any terminal of the network so that said identification number and said control key are included in said identification message, and checking mutual consistency between said identification number and said control key in accordance with a predetermined algorithm in said prepayment processor and, when consistency is established, verifying that said identification number is included in a list stored in said prepayment processor, the call being held by said payment processor when the number of consistency errors does not exceed a predetermined number and when said identification number is included in said list.

2. The method claimed in claim 1 wherein, when said predetermined terminal and said any terminal of the network are one and the same.

3. The method claimed in claim 1 wherein said prepayment processor transmits messages to said any terminal of the network via a voice message server.

4. The method claimed in claim 1 wherein said requesting step includes selecting one of at least two methods of payment.

5. The method claimed in claim 1 wherein said requesting step includes electronic payment processing entailing entry of a secret code at said any terminal of the network, said prepayment processor accepting the prepayment request if said secret code is recognized as being associated with said identification message and its entry has not been attempted a predetermined number of times.

6. The method claimed in claim 5 wherein said secret code is recorded in said prepayment processor without comparing it with said identification message when said consumption count is incremented for the first time by an amount resulting from an electronic funds transfer.

7. The method claimed in claim 1 wherein said requesting step includes making a bank card payment by entering at said any terminal in the network a predetermined number transmitted to said prepayment processor, the repayment processor accepting the prepayment request if said predetermined number is the correct length and is not included in a predetermined list of numbers.

8. The method claimed in claim 1 wherein said prepayment processor refuses said amount if at least one of the two following conditions is met:

the cumulative total of amounts paid (a) by a selected method of payment and (b) to said consumption account associated with said predetermined terminal exceeds a respective maximal amount over a respective number of days, and if the number of payments by the selected method of payment exceeds a respective maximal number over a respective number of days.

9. The method claimed in claim 1 wherein, in said paying step, said prepayment processing means transmits to said any terminal a balance of said consumption count before and after incrementing of said consumption count.

10. The method claimed in claim 1 wherein said prepayment processor, after incrementing said consumption count, transmits a provisional payment certificate to said any terminal of the network if said payment is an electronic funds transfer.

11. A method as claimed in claim 1 including, after said payment step, instigating an invitation to change a secret code used for electronic funds transfer and, in the event of a positive response to said invitation, changing said secret code.

12. A method of prepaying for consumption of telephone calls to be set up by a mobile phone terminal connected to a switched telephone network via a mobile phone network, comprising the following steps:

entering a particular telephone number at said mobile phone terminal thereby setting up a call from said mobile phone terminal to said mobile phone network, translating said particular telephone number into a call number of a prepayment processor by said mobile phone network, setting up a call by said particular telephone number from said mobile phone network to the prepayment processor through said switched telephone network whereby said mobile phone network transmits a message including an identification number identifying said mobile phone terminal to said prepayment processor, verifying that said identification number is included in a list stored in said prepayment processor, thereby clearing down said call by said payment processor when said identification number is not included in said list, when said identification number is included in said list, requesting transmission from said mobile phone terminal prepayment of telephone call consumption to said prepayment processor, and if the prepayment request is accepted by said prepayment processor, activating said mobile phone terminal to authorize paying an amount transmitted so that said prepayment processor increments a consumption count associated with said mobile phone terminal.

* * * * *